United States Patent
Horiuchi et al.

(10) Patent No.: US 8,925,577 B2
(45) Date of Patent: Jan. 6, 2015

(54) THROTTLING STRUCTURE FOR USE IN A FLUID PRESSURE DEVICE

(75) Inventors: Toru Horiuchi, Higashimurayama (JP); Kenji Tsukamoto, Tsukubamirai (JP)

(73) Assignee: SMC Kabushiki Kaisha, Tokyo (JP)

( * ) Notice: Subject to any disclaimer, the term of this patent is extended or adjusted under 35 U.S.C. 154(b) by 1003 days.

(21) Appl. No.: 12/359,551

(22) Filed: Jan. 26, 2009

(65) Prior Publication Data

US 2009/0260699 A1 Oct. 22, 2009

(30) Foreign Application Priority Data

Apr. 21, 2008 (JP) .................................. 2008-109830

(51) Int. Cl.
- F16K 31/12 (2006.01)
- F16K 31/36 (2006.01)
- G05D 11/00 (2006.01)
- G05D 16/06 (2006.01)

(52) U.S. Cl.
CPC .................................. G05D 16/0672 (2013.01)
USPC .................... 137/492; 137/116.5; 137/505.15

(58) Field of Classification Search
CPC ....... F16K 17/105; F16K 17/10; G05B 11/50; G05D 16/163; G05D 16/10; F15B 13/02; A01G 27/008; A24C 5/52; C08B 5/02
USPC ................ 137/116.3–116.5, 489, 489.5, 492, 137/505.15, 599.09, 906; 251/127; 138/42, 138/44, 40, 45

See application file for complete search history.

(56) References Cited

U.S. PATENT DOCUMENTS

| | | | | | |
|---|---|---|---|---|---|
| 2,187,662 | A | * | 1/1940 | Pigott | 251/127 |
| 3,586,104 | A | * | 6/1971 | Hyde | 166/142 |
| 4,372,528 | A | * | 2/1983 | Raftis | 251/127 |
| 4,549,718 | A | * | 10/1985 | Seger | 251/127 |
| 4,722,360 | A | * | 2/1988 | Odajima et al. | 137/489 |
| 6,019,121 | A | * | 2/2000 | Uehara | 137/489 |
| 6,244,297 | B1 | * | 6/2001 | Baumann | 251/127 |

(Continued)

FOREIGN PATENT DOCUMENTS

| CN | 101004160 A | 7/2007 |
|---|---|---|
| CN | 101008312 A | 8/2007 |

(Continued)

OTHER PUBLICATIONS

Korean Office Action issued Mar. 8, 2011, in Patent Application No. 10-2009-0034668.

(Continued)

*Primary Examiner* — Justin Jonaitis
*Assistant Examiner* — Chee-Chong Lee
(74) *Attorney, Agent, or Firm* — Oblon, Spivak, McClelland, Maier & Neustadt, L.L.P.

(57) ABSTRACT

The present invention relates to a throttling structure for use in a fluid pressure device. A nozzle passage is formed between a primary side port and a nozzle back pressure chamber. A throttling mechanism made up from a plurality of orifice plates is disposed in the nozzle passage. Small diameter opening holes, which are smaller in diameter than the nozzle passage, are provided in the orifice plates. Outer edge portions of the orifice plates are retained in a second body part via seal members. Further, the orifice plates are separated mutually from each other by a predetermined distance along the direction of extension of the nozzle passage.

6 Claims, 10 Drawing Sheets

(56) References Cited

U.S. PATENT DOCUMENTS

| | | | |
|---|---|---|---|
| 6,612,236 B2 * | 9/2003 | Frankenberger et al. | 101/232 |
| 7,516,734 B2 | 4/2009 | Tominaga et al. | |
| 2006/0108014 A1 * | 5/2006 | Marsh | 138/42 |

FOREIGN PATENT DOCUMENTS

| | | |
|---|---|---|
| JP | 5-14741 | 2/1993 |
| JP | 6-259145 | 9/1994 |
| JP | 10-198433 | 7/1998 |
| JP | 3787233 B2 | 6/2006 |
| KR | 1992-0004758 | 3/1992 |
| TW | 502796 | 9/2002 |

OTHER PUBLICATIONS

Office Action dated Nov. 26, 2010, in Chinese Patent Application No. 200910134772.3 (with English Translation).

Office Action issued Dec. 14, 2011, in Korean Patent Application No. 10-2009-0034668 (with English-language translation).

Combined Taiwanese Office Action and Search Report issued May 30, 2013, in Taiwanese Patent Application No. 098104931 with English translation.

Office Action issued Aug. 14, 2012 in Japanese Patent Application No. 2008-109830 (with English translation of pertinent portion).

* cited by examiner

THROTTLING STRUCTURE FOR USE IN A FLUID PRESSURE DEVICE

BACKGROUND OF THE INVENTION

1. Field of the Invention

The present invention relates to a throttling structure utilized in a fluid pressure device, which is capable of adjusting the pressure of a pressure fluid, in a fluid pressure device to and from which a pressure fluid is supplied and discharged.

2. Description of the Related Art

As disclosed in Japanese Laid-Open Patent Publication No. 10-198433, the present inventors have proposed a pressure-reducing valve, which is utilized in the case that air is to be supplied at a desired predetermined pressure from a pressure fluid supply source to a fluid pressure device. Such a pressure reducing valve reduces the pressure fluid of a primary side, to which pressure fluid is supplied from the pressure fluid supply source, to a desired pressure corresponding to a fluid pressure device, which is connected to a secondary side, and supplies the pressure fluid to the secondary side.

In recent years, in a fluid pressure device such as a pressure reducing valve, there has been a demand to reduce the consumed amount of the pressure fluid, from the standpoints of both lowering energy consumption and reducing costs.

SUMMARY OF THE INVENTION

A general object of the present invention is to provide a throttling structure for use in a fluid pressure device, which is capable of reducing the consumption amount of a pressure fluid, while also preventing clogging when the pressure fluid is caused to flow therethrough.

The present invention is characterized by a throttling structure for use in a fluid pressure device having a body in which a port is formed and to which a pressure fluid is supplied, for carrying out a pressure control on the pressure fluid, the throttling mechanism being equipped with an introduction chamber into which the pressure fluid is introduced, a communication passage that provides communication between the introduction chamber and the port, and a throttling mechanism disposed in the communication passage and having a plurality of flow passages through which the pressure fluid flows, the flow passages being smaller in diameter than the communication passage, for reducing a flow amount of the pressure fluid, wherein the plurality of flow passages are disposed mutually adjacent to each other along a flow direction of the pressure fluid.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
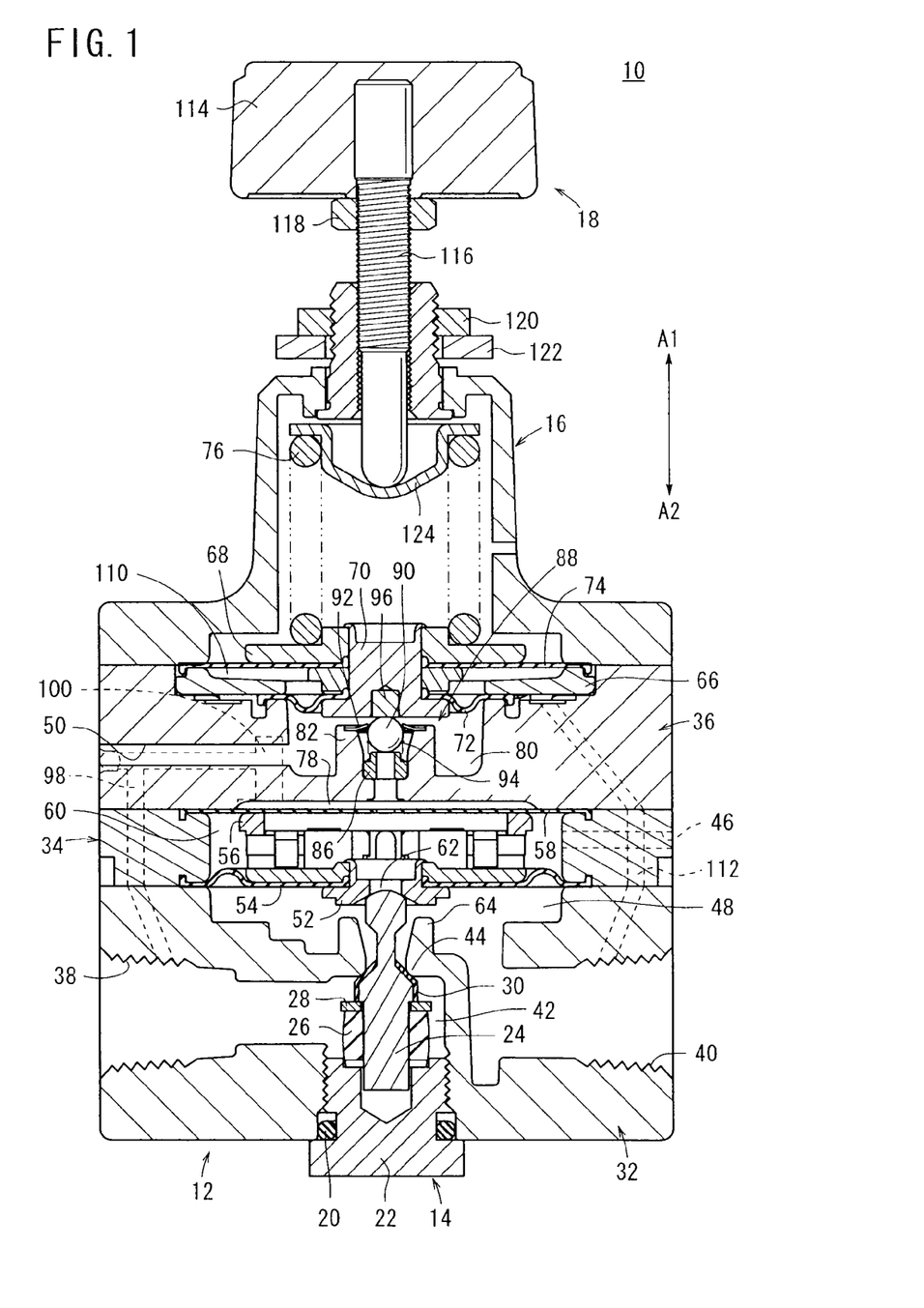
FIG. 1 is an overall structural view of a pressure reducing valve, to which a throttling structure for use in a fluid pressure device according to the present invention is applied.

In FIG. 1, reference numeral 10 indicates a pressure reducing valve 10, to which a throttling structure for use in a fluid pressure device according to the present invention is applied.

As shown in FIGS. 1 through 4, the pressure reducing valve 10 includes a body 12, a cover member 14 connected to a lower part of the body 12, a bonnet 16 connected to an upper part of the body 12, and an operating member 18, which is disposed rotatably on an upper portion of the bonnet 16.

The cover member 14 includes a valve guide 22 that hermetically closes and blocks a hole formed in a lower portion of the body 12 through an o-ring, a valve body 24 which is fitted into and supported by a hole formed in an upper portion of the valve guide 22, a damper 26 which is fitted into and supported within a groove formed in an upper portion of the valve guide 22 and which is fitted outwardly over the valve body 24, a washer 28 fitted outwardly over the valve body 24 on an upper portion of the damper 26, and an elastic seal 30 fitted outwardly over the valve body 24 at an upper portion of the washer 28. The valve body 24 is disposed so as to be capable of displacement along an axial direction (the direction of arrows A1 and A2) under a resilient action of the damper 26, which is formed, for example, from an elastic material such as rubber or the like.

The body 12 is made up from a first body part 32 engaged with the cover member 14, a second body part 34 arranged on an upper portion of the first body part 32, and a third body part 36 arranged on a further upper portion of the second body part 34. The first body part 32, the second body part 34 and the third body part 36 are assembled together in an integral manner by unillustrated screws.

A primary side port (port) 38 connected to an unillustrated fluid pressure supply source and a secondary side port 40 connected to an unillustrated fluid pressure device are formed respectively in both side surfaces of the first body part 32. A communication passage 42 is formed between the primary side port 38 and the secondary side port 40 for enabling communication therebetween.

Further, a seat 44 is formed to face toward the communication passage 42 in the interior of the first body part 32. By seating of the valve body 24 through the seal 30 with respect to the seat 44, the communication state between the primary side port 38 and the secondary side port 40 is interrupted.

On the other hand, by displacement of the valve body 24 in a direction (the direction of arrow A2) to separate away from the seat 44, a state of communication between the primary side port 38 and the secondary side port 40 is established.

A discharge port 46 that opens on one side thereof is formed in the second body part 34, and a bleed port 50, which opens on one side thereof and enables communication between a third diaphragm chamber 80 and the exterior, is formed in the third body part 36.

A first diaphragm 54 is sandwiched and gripped between the first body part 32 and the second body part 34 through a first retaining member 52. Further, a second diaphragm 58 is sandwiched and gripped between the second body part 34 and the third body part 36 through a second retaining member 56.

In addition, a first diaphragm chamber 48, which communicates with the secondary side port 40, is provided underneath the first diaphragm 54, and a second diaphragm chamber 60, which communicates with the discharge port 46, is provided between the first diaphragm 54 and the second diaphragm 58.

Further, in a center portion of the first diaphragm 54, the first retaining member 52 is provided, which engages with an edge of the valve body 24. A through hole 62 that enables communication between the first diaphragm chamber 48 and the second diaphragm chamber 60 is formed in the first retaining member 52.

Moreover, a stopper member 64, which projects in the center of the first body part 32 facing toward the first diaphragm chamber 48, serves to regulate displacement of the first retaining member 52 on the same axis with the seat 44.

A diaphragm pressing member 66 together with a third diaphragm 72 and a fourth diaphragm 74, which are separated a predetermined distance and gripped by a disk member 68 and a pressing member 70, are disposed between the third body part 36 and the bonnet 16. In this case, a first spring 76 is arranged on an end surface of the disk member 68, and the third diaphragm 72 and the fourth diaphragm 74 are pressed in a downward direction (in the direction of the arrow A2) by an elastic force of the first spring 76.

A nozzle back pressure chamber (introduction chamber) 78 is provided between the second body part 34 and the third body part 36, as defined by the second diaphragm 58 and the third body part 36. The third diaphragm chamber 80 is provided in a center portion of the third body part 36.

Further, downward of the third diaphragm chamber 80, a nozzle 86 having a nozzle hole 84 is arranged in a boss section 82 that projects in a cylindrical shape. The nozzle back pressure chamber 78 and the third diaphragm chamber 80 communicate through the nozzle hole 84, and through a hole that penetrates through a lower portion of the third body part 36.

Figure 2:
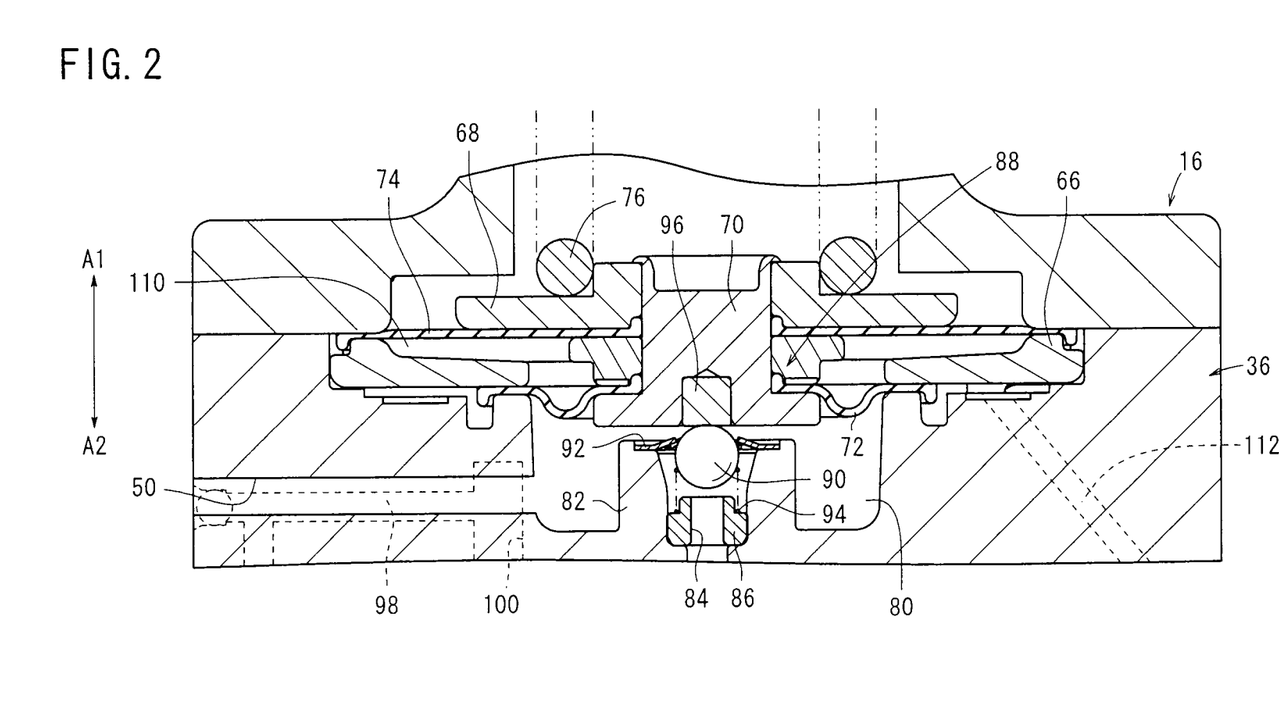
FIG. 2 is an enlarged cross sectional view showing the vicinity of a flapper mechanism in the pressure reducing valve of FIG. 1.

In addition, a flapper mechanism 88 is disposed upwardly of the nozzle 86 in the interior of the third diaphragm chamber 80. The flapper mechanism 88 includes a ball 90, a latch ring 92 that retains the ball 90 inside the boss section 82, and a second spring 94 interposed between the ball 90 and the nozzle 86. The second spring 94 urges the ball 90 toward the side of the latch ring 92 under a resilient action thereof. As a result, the ball 90 is retained in a state of abutment against the latch ring 92.

The flapper mechanism 88 includes the pressing member 70 and a pressure receiving member 96. The pressing member 70 includes a large concavity on the lower end thereof, wherein the pressure receiving member 96 is embedded within the concavity. The pressure receiving member 96 is in point contact with the ball 90, and is formed from a material (e.g., steel) having the same hardness or a greater hardness than the ball 90, which comprises a steel ball.

Additionally, in a state in which the ball 90 is retained inside the boss section 82, when the pressing member 70 is pressed and moved downwardly (in the direction of the arrow A2) by the elastic force of the first spring 76, the ball 90 is displaced toward the side of the nozzle 86 while compressing the second spring 94, whereupon the nozzle hole 84 of the nozzle 86 becomes closed. On the other hand, when the pressed condition of the pressing member 70 by the first spring 76 is released, the pressing member 70 is moved upwardly under a resilient action by the second spring 94, and the ball 90 separates away from the nozzle 86.

Figure 3:
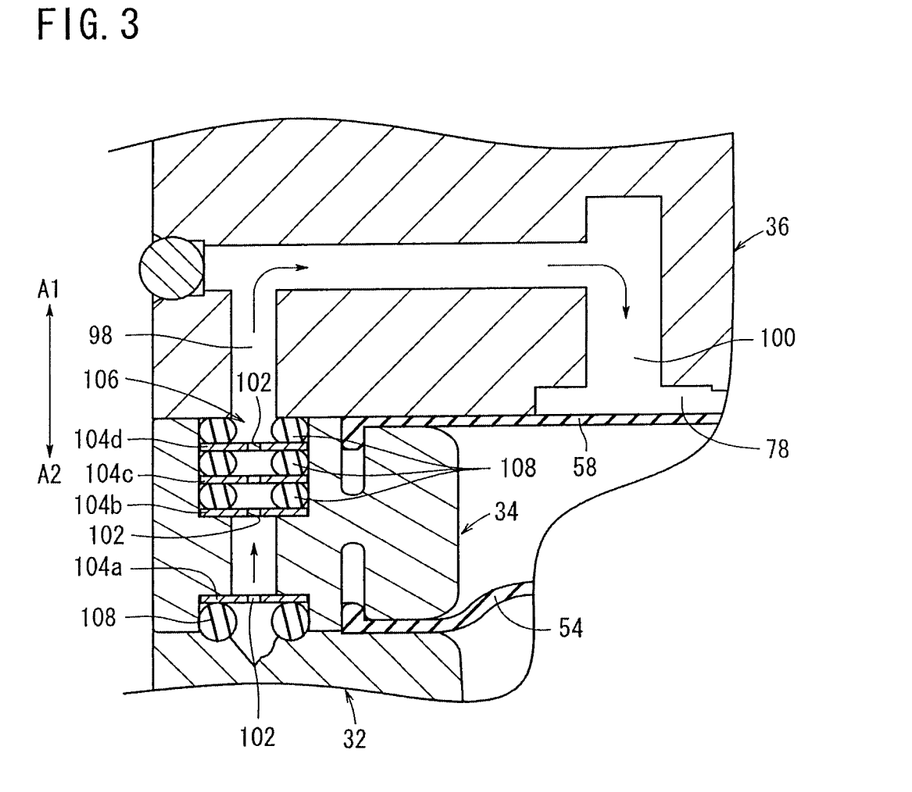
FIG. 3 is an enlarged cross sectional view showing the vicinity of a nozzle passage disposed in the pressure reducing valve of FIG. 1.
Figure 4:
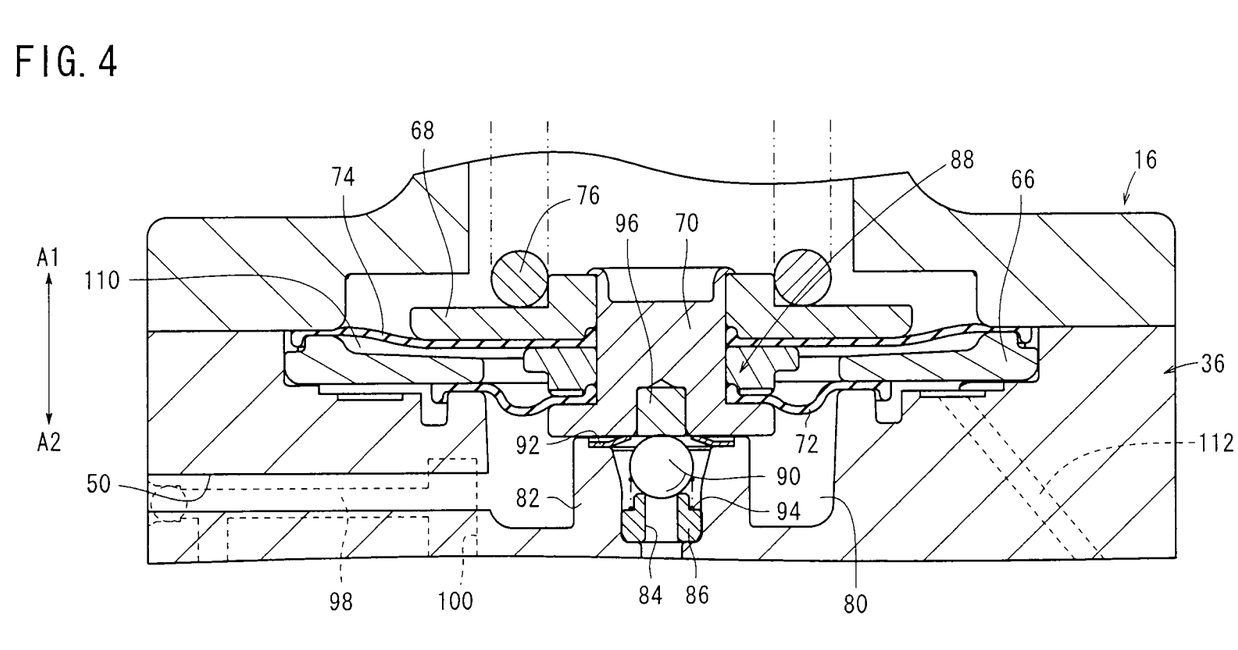
FIG. 4 is an enlarged cross sectional view showing a condition in which a ball is seated on a nozzle in the pressure reducing valve of FIG. 2.

As shown in FIG. 3, the nozzle back pressure chamber 78 communicates with the primary side port 38 via a nozzle passage (communication passage) 98. The nozzle passage 98 is connected to an outer circumferential side of the primary side port 38, extends along the axial direction (the direction of arrows A1 and A2) of the second and third body parts 34, 36, bends in a radial direction within the third body part 36, and ultimately is connected to a communication hole (opening) 100, which communicates with the nozzle back pressure chamber 78. In addition, a throttling mechanism 106 is disposed within the nozzle passage 98, which comprises a plurality of (e.g., four) orifice plates 104a to 104d that are capable of adjusting a flow amount of the pressure fluid that circulates through the nozzle passage 98 to a predetermined flow amount.

The orifice plates 104a to 104d that make up the throttling mechanism 106 include opening holes (flow passages) 102 in a center region thereof which are smaller in diameter than the communication passage, and are formed as disk-shaped thin plates, the peripheral edges of which are affixed in the second body part 34 through annular seal members 108. Further, the orifice plates 104a to 104d are disposed coaxially in the nozzle passage 98, and are arranged therein while being separated mutually from each other by predetermined distances. That is, the orifice plates 104a to 104d are arranged in a multistage fashion along the direction of extension of the nozzle passage 98.

In addition, the pressure fluid, which is supplied to the nozzle passage 98 from the primary side port 38, flows through the opening holes 102 provided in the plural orifice plates 104a to 104d, and is directed into the nozzle back pressure chamber 78.

On the other hand, a feedback passage 112 is provided between the secondary side port 40 and a fourth diaphragm chamber 110 that is formed between the third diaphragm 72 and the fourth diaphragm 74, for establishing communication between the fourth diaphragm chamber 110 and the secondary side port 40. The feedback passage 112 is provided on an opposite side from the nozzle passage 98 about the center of the valve body 24.

The operating member 18 includes a handle 114 disposed rotatably on an upper portion of the bonnet 16, a shaft 116 that rotatably supports the handle 114, a lock nut 118 that fixes the position of the handle 114 and the shaft 116, and a nut 120 and a washer 122 that sandwich a non-illustrated bracket therebetween. A receiving member 124, which engages with the first spring 76 and presses the first spring 76 in the direction of the arrow A2, is provided on one end of the handle 114. The receiving member 124 is pressed toward the side of the body 12 by displacement of the shaft 116 in the axial direction upon rotation of the handle 114.

The pressure reducing valve 10, to which a throttling structure for use in a fluid pressure device according to the present invention is applied, is constructed basically as described above. Next, operations and advantageous effects of the present invention shall be explained.

First, a pressure fluid supply source (not shown) is connected to the primary side port 38 through a non-illustrated tube or the like, whereas a fluid pressure device such as a cylinder or the like, which is driven under the supply of a pressure fluid, is connected to the secondary side port 40.

After such preparatory operations have been completed, a condition is set up in which a gap exists between the ball 90 and the nozzle 86 constituting the flapper mechanism 88, without the handle 114 being rotated. More specifically, the elastic force of the first spring 76 is not activated, whereas on the other hand, the elastic force of the second spring 94 is applied to the ball 90, such that a predetermined separation is maintained between the nozzle 86 and the ball 90 (see FIG. 2).

In this case, after the pressure fluid supplied to the primary side port 38 has flowed from the nozzle passage 98 and through the opening holes 102 of the plural orifice plates 104a to 104d to the communication hole 100, the pressure fluid is introduced into the nozzle back pressure chamber 78, passes through the gap between the nozzle 86 and the ball 90, and is introduced into the third diaphragm chamber 80. Additionally, the pressure fluid introduced into the third diaphragm chamber 80 is discharged to the outside from the bleed port 50.

In greater detail, the pressure fluid that flows through the nozzle passage 98 passes through the opening hole 102 of the orifice plate 104a, which is disposed foremost on the upstream side, and then passes through to the side of the adjacent orifice plate 104b. At this time, because the diameter D of the opening hole 102 is formed to be smaller in diameter than the passage diameter of the nozzle passage 98, a pressure loss occurs when the pressure fluid passes therethrough and the flow amount of the pressure fluid is reduced. In addition, the pressure fluid, the flow amount of which has been reduced, passes successively in a downstream direction through the orifice plate 104b, the orifice plate 104c and the orifice plate 104d, whereby the effective cross sectional area thereof is further reduced, and the pressure fluid is supplied into the nozzle back pressure chamber 78.

As a result, the throttling mechanism 106 made up from multiple orifice plates 104a to 104d is provided, which enables the flow amount of the pressure fluid to be reduced in comparison to a conventional fluid pressure device, which is not equipped with the throttling mechanism 106, by supplying the pressure fluid having passed through the orifice plates 104a to 104d into the nozzle back pressure chamber 78.

While in the bleed state as described above, the handle 114 is rotated in a predetermined direction, and the pressing member 70 is pressed downwardly (in the direction of the arrow A2) through the disk member 68 by means of the elastic force of the first spring 76. As a result, the ball 90 is displaced in a direction (the direction of arrow A2) to separate from the latch ring 92 against the elastic force of the second spring 94, whereupon the ball 90 abuts against the nozzle hole 84 of the nozzle 86 and thereby closes the nozzle hole 84 (see FIG. 4).

As a result, the pressure (nozzle back pressure) in the nozzle back pressure chamber 78 is raised, and the second diaphragm 58 is pressed in the direction of the arrow A2 under an action of the back pressure from the nozzle 86. The second diaphragm 58, the first diaphragm 54 and the valve body 24 are displaced integrally in the direction of the arrow A2, and the valve body 24 separates from the seat 44.

Owing thereto, the communication passage 42 is opened, thereby establishing communication between the primary side port 38 and the secondary side port 40, and the pressure of the pressure fluid in the secondary side port 40 is raised.

On the other hand, when the pressure of the pressure fluid in the secondary side port 40 rises to a level at or above a predetermined pressure value, the pressure fluid that has risen to such a pressure presses upwardly (in the direction of the arrow A1) on the first diaphragm 54 and is introduced into the fourth diaphragm chamber 110 through the feedback passage. Owing thereto, the fourth diaphragm 74 is pressed by the pressure of the pressure fluid in the direction of the arrow A1 in opposition to the elastic force of the first spring 76, accompanied by displacement of the disk member 68 and the pressing member 70 in the direction of the arrow A1.

At this time, since the ball 90 is displaced in the direction of the arrow A1 due to the elastic force of the second spring 94, the ball 90 that constitutes the flapper mechanism 88 separates from the nozzle 86 (see FIG. 2). Owing thereto, the pressure fluid inside the nozzle back pressure chamber 78 passes through the gap between the nozzle 86 and the ball 90, and then passes through the bleed port 50 and is discharged to the atmosphere. As a result, the nozzle back pressure in the nozzle back pressure chamber 78 is lowered very quickly.

In this manner, by quickly reducing the back pressure of the nozzle 86, the first diaphragm 54 and the second diaphragm 58 are raised upwardly in the direction of the arrow A1, and the end of the valve body 24 separates away from the first retaining member 52. Additionally, the valve body 24 is displaced in the direction of the arrow A1 by the elastic force of the damper 26 and is seated on the seat 44. Consequently, the through hole 62 of the first retaining member 52, which was closed by the valve body 24, is placed in an open condition, and the pressure fluid, the pressure of which has been raised at the secondary side port 40, is introduced into the second diaphragm chamber 60 via the through hole 62. Thereafter, the pressure fluid is discharged to the outside from the discharge port 46.

Figure 5:
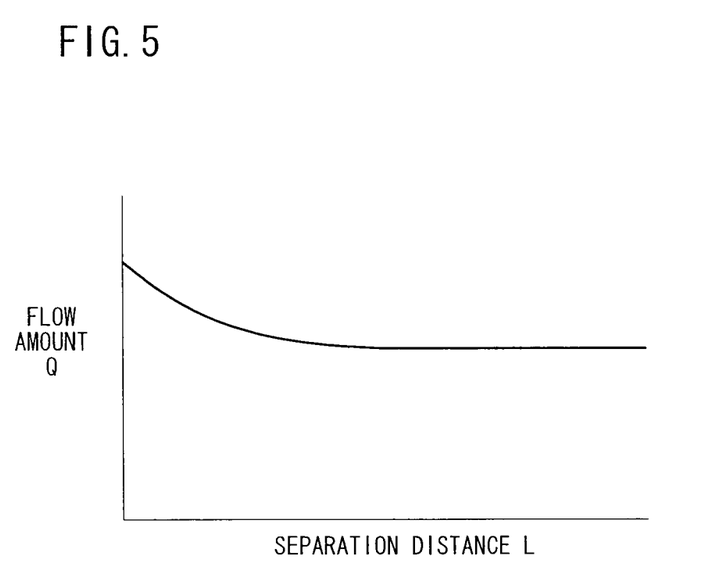
FIG. 5 illustrates a characteristic curve showing a relationship between a separation distance of orifice plates making up the throttling mechanism and a flow amount of a pressure fluid that flows through opening holes of the orifice plates.

Next, a brief explanation shall be made with reference to FIG. 5, concerning the relationship between the mutual separation distance L of orifice plates 104a to 104d making up the throttling mechanism 106 and a flow amount of a pressure fluid that flows through the opening holes 102 of the orifice plates 104a to 104d.

As understood from FIG. 5, as the relative distance L between adjacent orifice plates is set larger, the effective cross sectional area thereof can be gradually reduced. After the distance L reaches a predetermined range, the reduction in the flow amount stops and is maintained substantially constant. More specifically, for example, in the event that the distance L between the orifice plate 104a and the adjacent orifice plate 104b is small, the pressure fluid throttled by the opening hole 102 of the upstream side orifice plate 104a is introduced continuously to the opening hole 102 of the orifice plate 104b, without fully expanding to the passage diameter of the nozzle passage 98. Owing thereto, a sufficient throttling effect by the orifice plate 104b cannot be obtained.

Conversely, in the event that the distance L between the adjacent orifice plates 104a and 104b is assured to be large, the pressure fluid throttled by the opening hole 102 of the orifice plate 104a expands at once up to the passage diameter of the nozzle passage 98, and thereafter, because the fluid flows again through the opening hole 102 of the orifice plate 104b, the composite effective cross sectional area is suitably reduced.

Figure 6:
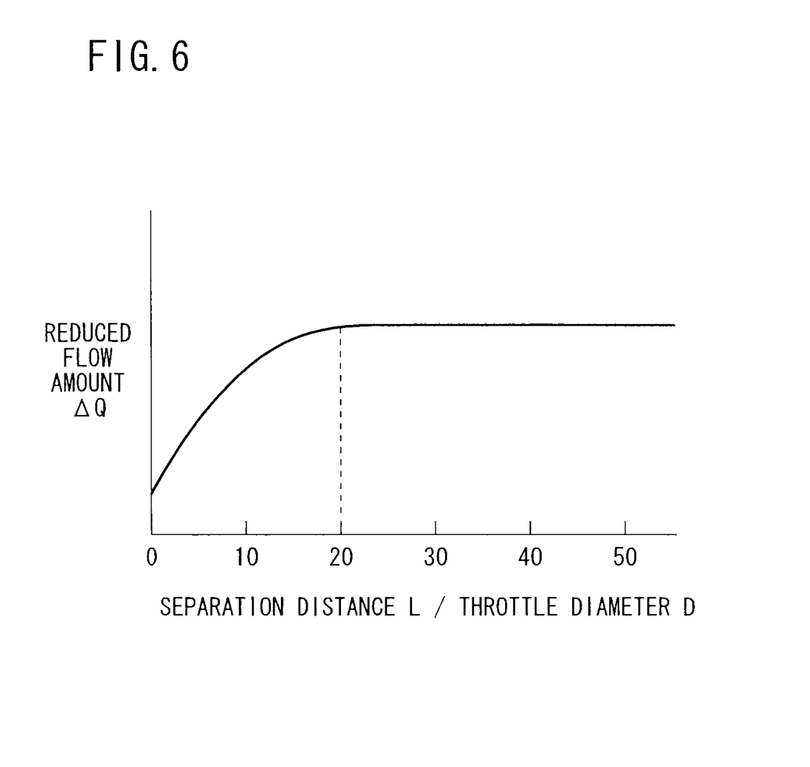
FIG. 6 illustrates a characteristic curve showing a relationship between a distance-diameter ratio, formed by the diameters of the opening holes and the separation distance of the orifice plates, and a reduced flow amount of a pressure fluid with respect to a case in which the throttling mechanism is not provided.

Next, a brief explanation shall be made with reference to FIG. 6, concerning the relationship between a distance-diameter ratio L/D, formed by the diameters D of the opening holes 102 and the separation distance L of the orifice plates 104a to 104b constituting the throttling mechanism 106, and a reduced flow amount ΔQ of the pressure fluid with respect to a case in which the throttling mechanism is not provided.

As understood from FIG. 6, along with setting the aforementioned distance-diameter ratio L/D to be large, the flow amount of the pressure fluid gradually decreases, thus enabling the reduced flow amount ΔQ to be increased. More specifically, by setting the relationship between the distance L and the diameter D of the opening hole such that L/D is greater than or equal to approximately 20, the reduced flow amount ΔQ of the pressure fluid can be maximized.

In the foregoing manner, according to the present embodiment, the throttling mechanism 106 made up from a plurality of orifice plates 104a to 104d is provided in the nozzle passage 98, through which the primary side port 38 and the nozzle back pressure chamber 78 are communicated. The orifice plates 104a to 104d are arranged in a straight line along the nozzle passage 98, and the pressure fluid is made to flow through the opening holes 102 formed in the centers of the orifice plates 104a to 104d. Owing thereto, the pressure fluid that flows through the nozzle passage 98 flows in succession through the opening holes 102 of the orifice plates 104a to 104d, which are arranged with predetermined interval separations therebetween, whereby the effective cross sectional area within the nozzle passage 98 can be reduced. As a result, the consumed amount of pressure fluid can favorably be reduced, thereby promoting energy savings, together with enabling a reduction in the running cost of the fluid pressure device.

Further, generally, in the event that the consumption amount of pressure fluid used by a conventional fluid pressure device comprising a pressure reducing valve having a unitary throttle therein is to be reduced, it may be contemplated to further minimize the diameter of the throttle, for thereby reducing the flow amount of the pressure fluid. However, in the case that the throttle is made smaller in diameter, there is a concern that clogging might occur due to dust and the like contained within the pressure fluid.

By contrast, according to the present embodiment, the orifice plates 104a to 104d constituting the throttling mechanism 106 are disposed in plurality coaxially within the nozzle passage 98, and by passing the pressure fluid successively through the opening holes 102, the flow amount of the pressure fluid can be reduced in a stepwise manner. Thus, compared to forming a small diameter in the aforementioned unitary throttle, the diameters D of the opening holes 102 can be set larger. As a result, clogging of the opening holes 102 with dust or the like contained within the pressure fluid can be suppressed, and the maintenance cycle of the pressure reducing valve 10 (fluid pressure device) having the throttling mechanism 106 can be extended, together with reducing the maintenance operations required for the fluid pressure device. Stated otherwise, the maintainability of the pressure reducing valve 10 can be enhanced.

In relation to the aforementioned pressure reducing valve 10, a case has been described in which plural orifice plates 104a to 104d were arranged coaxially and separated by predetermined distances in the nozzle passage 98. However, the present invention is not necessarily limited to such features.

Figure 7A:
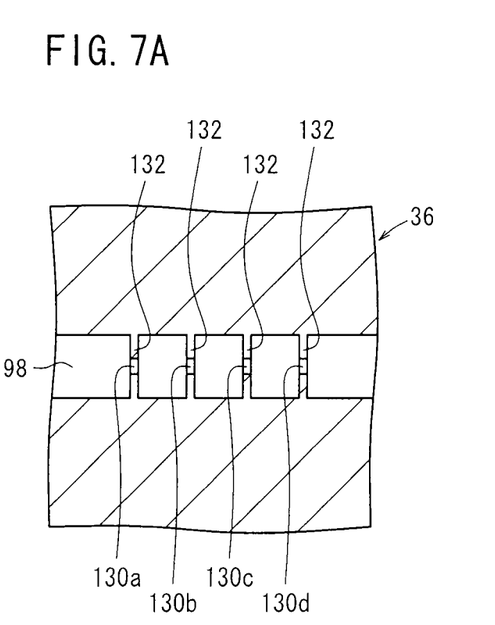
FIG. 7A illustrates a modified example showing a case in which a plurality of throttle holes are formed coaxially in a nozzle passage.
Figure 7B:
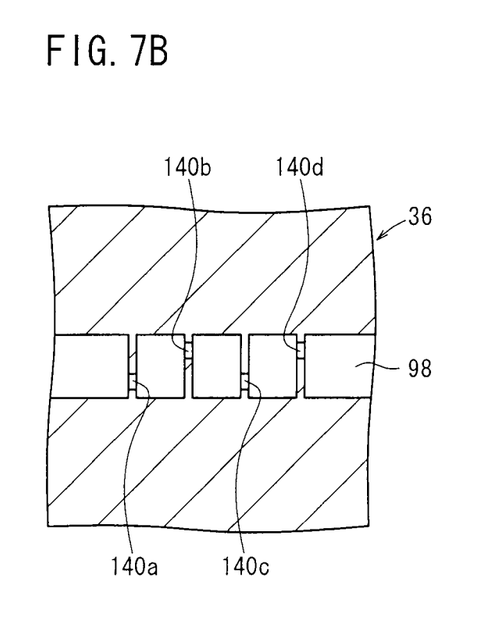
FIG. 7B illustrates a further modified example showing a case in which the plurality of throttle holes are offset perpendicularly with respect to the axis of the nozzle passage.

For example, as shown in FIG. 7A, a plurality of throttle holes 130a to 130d may be disposed directly in the nozzle passage 98. In this case, the throttle holes 130a to 130d are disposed respectively along the axis of the nozzle passage 98, and are formed centrally in wall portions 132, which are separated mutually by a predetermined distance along the axial direction. In this manner, by providing the plural throttle holes 130a to 130d directly with respect to the nozzle passage 98, compared to the previously discussed case of the orifice plates 104a to 104d, the number of components making up the throttling mechanism can be reduced, along with enabling a reduction in the number of assembly steps. Further, as shown in FIG. 7B, the plural orifice holes 140a to 140b disposed in the nozzle passage 98 may also be arranged so as to be offset mutually from each other in perpendicular directions with respect to the axis of the nozzle passage 98. Incidentally, in the case that the orifice holes 140a to 140b are mutually offset (off-centered) in this manner, it is unnecessary for the orifice holes 140a to 140b themselves to be separated mutually from each other along the same axial direction.

Figure 8:
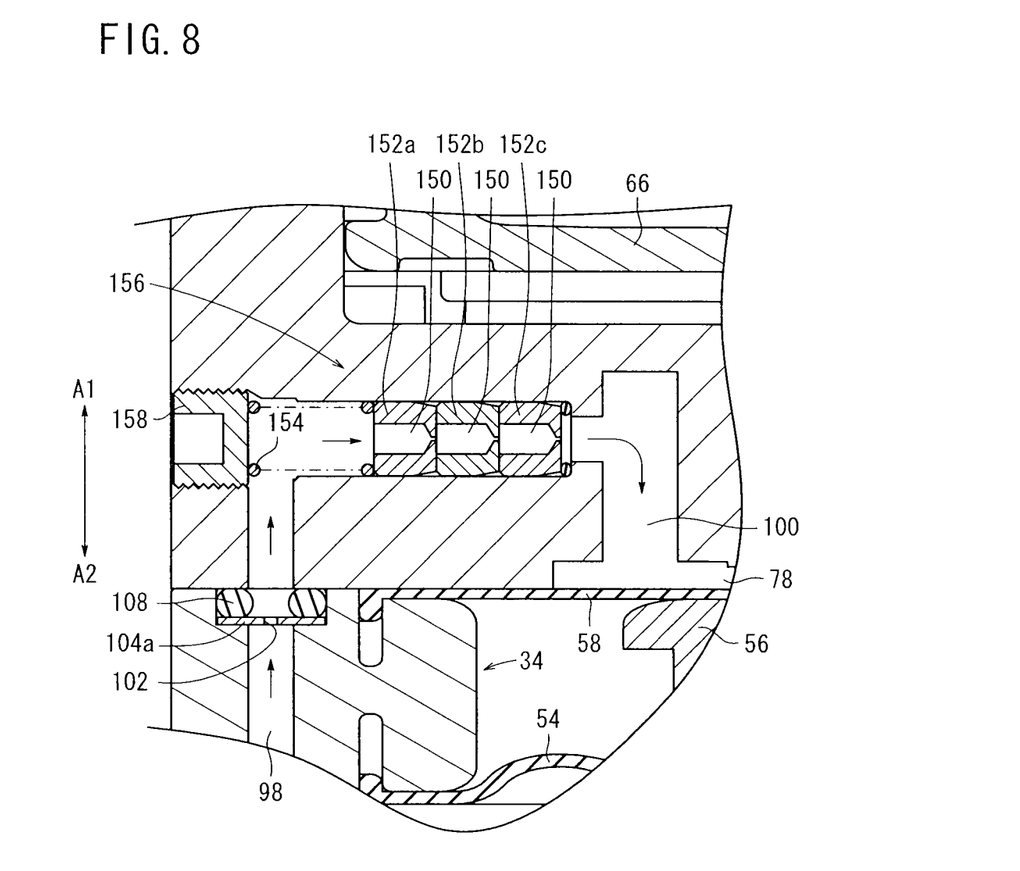
FIG. 8 is an enlarged cross sectional view showing a throttling mechanism according to a first modified example.

For example, as shown in FIG. 8, in place of the throttling mechanism 106 according to the aforementioned embodiment, a throttling mechanism 156 in accordance with a first modified example may be applied. In the first modified example, a single orifice plate 104a is disposed in the nozzle passage 98 in the second body part 34, and further, wherein orifice blocks 152a to 152c having throttle holes 150 in the centers thereof are disposed in plurality within the section of the nozzle passage 98 that extends in a radially inward direction in the third body part 36, and having a third spring 154 that urges the orifice blocks 152a to 152c toward the side of the communication hole 100.

The throttling mechanism 156 includes a plurality of (e.g., three) orifice blocks 152a to 152c. The orifice blocks 152a to 152c are formed in cylindrical shapes having an outer circumferential diameter corresponding to the inner diameter of the nozzle passage 98. Throttle holes 150, which are formed with small diameters at one end side thereof, open respectively into the interior of the orifice blocks 152a to 152c. In the orifice blocks 152a to 152c, the small diameter regions of the throttle holes 150 are arranged coaxially on the side of the communication hole 100, more specifically, on the downstream side of the pressure fluid that flows through the nozzle passage 98, and the third spring 154 is interposed between the upstream side orifice block 152a arranged at a position separated farthest from the communication hole 100 and a plug 158 installed in the open end of the nozzle passage 98. Consequently, the plural orifice blocks 152a to 152c are normally held in a state of being pressed toward the side of the communication hole 100 by the resiliency of the third spring 154.

In addition, after the pressure fluid supplied to the nozzle passage 98 has flowed through the opening hole 102 of the orifice plate 104a, the pressure fluid is supplied from the communication hole 100 to the nozzle back pressure chamber 78, having past from the throttle hole 150 of the orifice block 152a positioned foremost on the upstream side, and through the throttle holes 150 of each of the orifice blocks 152b and 152c.

Figure 9:
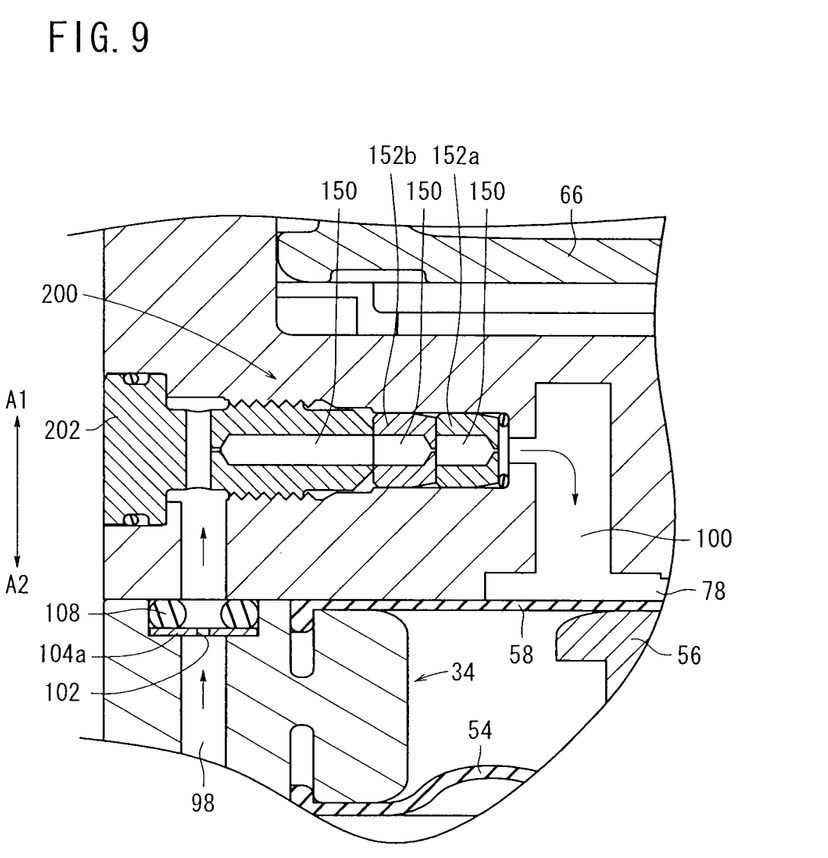
FIG. 9 is an enlarged cross sectional view showing a throttling mechanism according to a second modified example.

Furthermore, as shown in FIG. 9, in place of the throttling mechanism 106 according to the aforementioned embodiment, a throttling mechanism 200 in accordance with a second modified example may be applied. The throttling mechanism 200 differs in that, in place of the third spring 154 that makes up part of the throttling mechanism 156 according to the first modified example, a plug 202 is provided, in which the plug 158 and the orifice block 152a are integrated into a single unit.

Figure 10A:
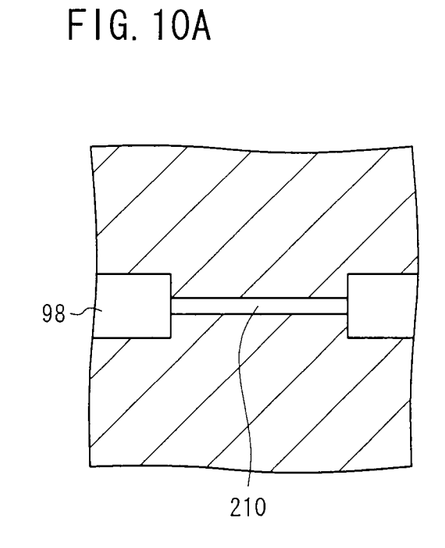
FIG. 10A is a conceptual diagram showing a throttling mechanism having a substantially fixed diameter throttling passage therein.
Figure 10B:
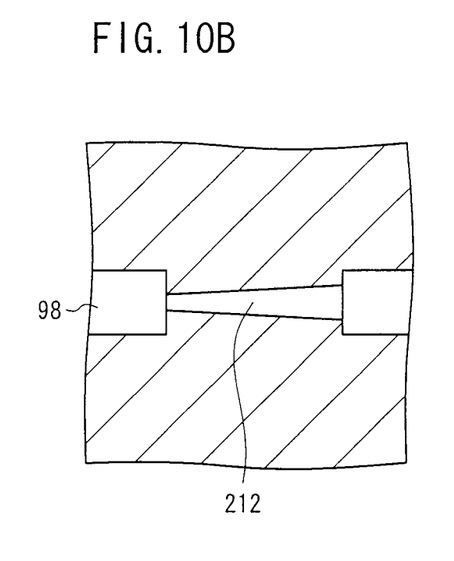
FIG. 10B is a conceptual diagram showing a throttling mechanism having a throttling passage therein, which gradually expands in diameter in a direction toward a communication hole side thereof.

On the other hand, the invention is not limited to cases, as mentioned above, in which the throttling mechanisms 106, 156 are constituted by a multistage arrangement of plural orifice plates 104a to 104d or orifice blocks 152a to 152c. As shown in FIG. 10A, a throttling passage 210, which is reduced diametrically at a fixed diameter with respect to the nozzle passage 98, may be provided at an intermediate position in the nozzle passage 98, such that the effective cross sectional area is throttled between the nozzle passage 98 and the communication hole 100. Further, as shown in FIG. 10B, the diameter of the throttle passage 212 may be gradually expanded toward the downstream side of the nozzle passage 98.

The throttle structure for use in a fluid pressure device according to the present invention is not limited to the aforementioned embodiment. It is a matter of course that various other structures or modifications could be adopted, which do not deviate from the essence of the present invention as set forth in the appended claims.

What is claimed is:

1. A throttling structure for use in a fluid pressure device having a body, including a first body part, a second body part arranged on an upper portion of the first body part, and a third body part arranged on a further upper portion of the second body part, in which a port is formed in the first body part to which a pressure fluid is supplied, for carrying out a pressure control on the pressure fluid, comprising:

an introduction chamber configured to be provided between the second body part and the third body part into which the pressure fluid is introduced;

a communication passage configured to provide communication between the introduction chamber and the port, the communication passage extending along an axial direction of the second and third body parts, bending in a radial direction within the third body part, and connecting to a communication hole in communication with the introduction chamber; and a throttling mechanism disposed in the communication passage and having a plurality of flow passages through which the pressure fluid flows, the flow passages being smaller in diameter than the communication passage, for reducing a flow amount of the pressure fluid, wherein the plurality of flow passages are disposed mutually adjacent to each other at predetermined intervals along a flow direction of the pressure fluid, and wherein the throttling mechanism includes a plurality of orifice plates with seal members provided on peripheral edges of the orifice plates such that at least one of the seal members is sandwiched between the orifice plates, each of the orifice plates includes an opening hole provided in a middle of the orifice plate and defining the flow passage, the opening holes being aligned with each other and parallel to the flow passage, a lowermost orifice plate being sandwiched, in the axial direction, between a lowermost seal member abutting the upper portion of the first body part and a lower portion of the second body part, and an uppermost orifice plate abutting an uppermost seal member abutting a lower portion of the third body part.

2. The throttling structure according to claim 1, wherein the plural flow passages are arranged in parallel to the flow direction of the pressure fluid, and further, are separated mutually from each other along a direction of extension of the communication passage.

3. The throttling structure according to claim 2, wherein the plural flow passages are disposed along a straight line coaxially in the communication passage.

4. The throttling structure according to claim 3, wherein among the plurality of flow passages, a flow amount of the pressure fluid is made to change by changing a distance between two adjacent flow passages.

5. The throttling structure according to claim 4, wherein among the plurality of flow passages, the distance between two adjacent flow passages is set to be at least 20 times the diameter of the flow passages.

6. The throttling structure according to claim 1, the fluid pressure device further comprising:

a diaphragm chamber that communicates with the introduction chamber through a nozzle; and a flapper disposed in the diaphragm chamber, the flapper controlling the flow of the pressure fluid introduced from the introduction chamber into the diaphragm chamber via the nozzle, by means of separating and blocking actions of the flapper with respect to the nozzle, wherein the fluid pressure device comprises a pressure reducing valve, in which the pressure fluid supplied from one port is reduced in pressure to a desired pressure and is directed to another port.

* * * * *